United States Patent
Anke et al.

(10) Patent No.: US 7,616,960 B2
(45) Date of Patent: Nov. 10, 2009

(54) CHANNEL SELECTION FOR WIRELESS TRANSMISSION FROM A REMOTE DEVICE

(75) Inventors: Juergen Anke, Dresden (DE); Marlo Neugebauer, Dresden (DE); Gregor Hackenbroich, Dresden (DE)

(73) Assignee: SAP AG, Walldorf (DE)

( * ) Notice: Subject to any disclaimer, the term of this patent is extended or adjusted under 35 U.S.C. 154(b) by 455 days.

(21) Appl. No.: 11/395,960

(22) Filed: Mar. 31, 2006

(65) Prior Publication Data

US 2007/0232230 A1 Oct. 4, 2007

(51) Int. Cl.
  H04W 72/00 (2009.01)
  H04W 40/00 (2009.01)
  H04W 4/00 (2009.01)
  H04B 7/24 (2006.01)
  H04L 12/16 (2006.01)
  H04B 7/212 (2006.01)
  H04L 12/28 (2006.01)

(52) U.S. Cl. .................. 455/450; 455/445; 455/39; 455/466; 370/443; 370/444; 370/235; 370/412

(58) Field of Classification Search ................ 455/450, 455/445, 39, 466; 370/443, 444, 235, 412
See application file for complete search history.

(56) References Cited

U.S. PATENT DOCUMENTS

| | | | | |
|---|---|---|---|---|
| 5,886,988 A | * | 3/1999 | Yun et al. | 370/329 |
| 6,091,709 A | * | 7/2000 | Harrison et al. | 370/235 |
| 6,108,307 A | * | 8/2000 | McConnell et al. | 370/235 |
| 6,115,365 A | * | 9/2000 | Newberg et al. | 370/312 |
| 6,501,733 B1 | * | 12/2002 | Falco et al. | 370/235 |
| 6,816,458 B1 | * | 11/2004 | Kroon | 370/235 |
| 2002/0137521 A1 | * | 9/2002 | Kim et al. | 455/453 |
| 2003/0210680 A1 | * | 11/2003 | Rao et al. | 370/352 |
| 2004/0092278 A1 | * | 5/2004 | Diepstraten et al. | 455/512 |
| 2004/0095901 A1 | * | 5/2004 | Rajkotia | 370/328 |
| 2004/0264475 A1 | * | 12/2004 | Kowalski | 370/395.5 |
| 2005/0047425 A1 | * | 3/2005 | Liu et al. | 370/411 |
| 2005/0159160 A1 | * | 7/2005 | Chambers et al. | 455/445 |

* cited by examiner

*Primary Examiner*—Vincent P Harper
*Assistant Examiner*—Ariel Balaoing
(74) *Attorney, Agent, or Firm*—Kenyon & Kenyon LLP (57) ABSTRACT

A remote device having the ability to transmit data across a plurality of wireless channels selects the transmission channel for transmitting the data message. The remote device prioritizes the data message based on an examination of the data message relative to predetermined priority settings. Based on this prioritization and in relation to a transmission prediction term, the remote device assigns the data message to a message queue associated with the selected transmission channel. When the remote device enters the transmission range of the selected channel, the data message may thereupon be wirelessly transmitted.

19 Claims, 5 Drawing Sheets

| EVENT | PRIORITY LEVEL |
|---|---|
| EVENT_1 | CRITICAL |
| EVENT_2 | SIGNIFICANT |
| EVENT_3 | SIGNIFICANT |
| ⋮ | ⋮ |
| EVENT_N | INFORMATIVE |

FIG. 7

CHANNEL SELECTION FOR WIRELESS TRANSMISSION FROM A REMOTE DEVICE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to wireless data transmission from a remote device and more specifically to predicting and selecting a best available wireless channel for wireless transmission of the data.

Remote processing devices can include one or more means for communicating with either a back end system or other external system. With the advancement of wireless technologies, there is an increase in the number of available wireless transmission channels. Each of these channels include inherent costs and benefits based various factors such as the transmission cost, the available bandwidth and network availability. Typically, the channels having higher bandwidth and greater network availability also have a higher transmission cost. Therefore, when multiple channels are available, it can be beneficial to select the best channel to achieve the data transmission and limit associated costs.

It is known in various remote processing devices to select between available networks. In existing multi-modal communication techniques, the remote device selects between available networks as they become available. For example, a remote device, such as a mobile phone, may use a cellular network to begin a wireless communication. Then, when the mobile phone recognizes the presence of an available wireless local area network (commonly referred to as a hotspot), the mobile phone simply converts to the wireless network and disconnects the cellular transmission. This may afford the user a cost savings based on the less expensive wireless network over the costly cellular transmission costs. Although, with existing multi-modal communication techniques, network transmission switching is only performed when the mobile device is actively transmitting and there is an active need to examine and compare available networks.

In another technique, as described in commonly assigned U.S. patent application Ser. No. 11/325,824, entitled "Priority Assignment and Transmission of Sensor Data," data messages are assigned to be transmitted by selected channels based on pre-examination of the data message in relation to the cost of existing channels. This technique includes queuing the messages into buffers assigned to each transmission channel, then when the channel becomes available, the messages in the queue are directly transmitted. In this approach, the messages remained queued until the mobile device enters the transmission range of the associated channel or until the mobile device re-evaluates the queued message for the selection of alternative transmission channels.

In another technique, as described in commonly assigned U.S. patent application Ser. No. 11/351,466, entitled "Transmission of Sensor Data Based on Geographical Navigational Data," in addition to queuing of data messages, travel directions of the mobile device are also examined. In this technique, the travel directions of the mobile device may be associated with a mapping or navigational system, such as found in a motor vehicle, for example, and compared to the network service areas defined by the service providers. Based on the navigational data, the data messages may be queued or transferred between queues for transmission such as using either wireless or physically hard-wired connections in relation to the assigned priority of the data message.

In these existing approaches, techniques for improving the cost-effectiveness and efficiency of wireless transmissions is based on either an examination of the message to be sent or an examination of the currently available networks during active transmission. The multi-modal communication device's examination of different channels is limited to active transmission times, such as notifying the user of available networks, such as an on-screen display or indicator, or actively switching channels during active communication sessions. The queueing approaches examine the priority of the message and the navigational data that anticipates the directed directions of the mobile device.

DETAILED DESCRIPTION

Generally, a remote device having the ability to transmit data across a plurality of wireless channels selects the transmission channel for transmitting the data message. The remote device prioritizes the data message based on an examination of the data message relative to predetermined priority settings. Based on this prioritization and in relation to a transmission prediction term, the remote device assigns the data message to a message queue associated with the selected transmission channel. When the remote device enters the transmission range of the selected channel, the data message may thereupon be wirelessly transmitted.

Figure 1:
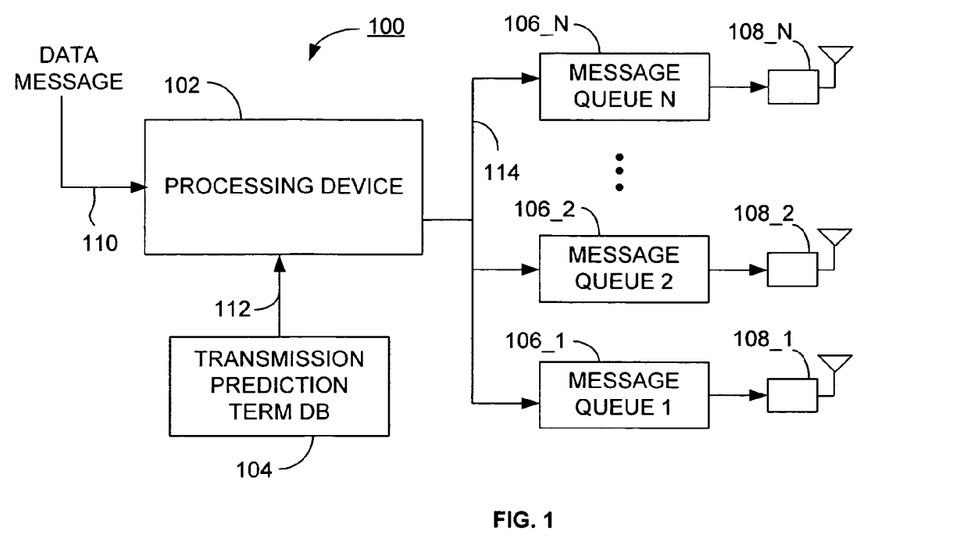
FIG. 1 illustrates a block diagram of one embodiment of a remote device for transmitting data across one of a plurality of wireless channels.

More specifically, FIG. 1 illustrates a remote device 100 including a processing device 102, a transmission prediction term database 104, a plurality of message queues 106_1, 106_2, 106_N, where N represents any suitable integer value (collectively referred to as 106), and a plurality of corresponding transmitting devices 108_1, 108_2, 108_N (collectively referred to as 108).

The processing device 102 may be one or more suitable processing devices operative to perform processing operations in response to executable instructions. The transmission prediction term database 104 may be any suitable type of storage device having prediction terms stored therein. As discussed in further detail below, the prediction terms identify the predicted likelihood of network availability for the different available wireless channels of the remote device 100. The message queues 106 are each associated with the corresponding transmitting devices 108, as illustrated in FIG. 1. The queues 106 may be any suitable memory device allowing for buffering of data until an open communication channel is available through the transmitting device 108. In one embodiment, the queues 106 may be a first in first out (FIFO) buffer. The transmitting devices 108 may be any suitable devices as recognized by one having ordinary skill in the art for wirelessly transmitting data from the mobile device to one or more recipient devices. Additionally, the devices 108 allow for the active monitoring of when the associated wireless channel is available, as discussed in further detail below.

In the embodiment of FIG. 1, the remote device 100 may include any number of components (not expressly illustrated) that generate data messages 110. The data message 110 may include information as to the operation of the remote device 100 itself or components in the device. For example, if the remote device 100 is a motor vehicle, the data message may be an engine oil level measurement sensor determining whether the motor vehicle needs to be serviced to have oil added. In another example, if remote device 100 is a personal digital assistant (PDA), the data message may be an error message generated by an application running on the device itself.

The data message 110 includes information usable by one or processing systems external to the remote device 100. In the example of a motor vehicle, a central data processing network may utilize the oil fluid level measurement to note the current operation of the vehicle and to attempt to schedule a maintenance visit for the vehicle. Therefore, it may be desirable for the remote device 100 to transmit the data message 110 to a specific vehicle maintenance system, such as with fleet vehicles or luxury vehicles under warranty.

In the remote device, the transmission prediction term database 104 includes a plurality of prediction terms 112. As discussed in further detail below, the prediction terms 112 are generated based on the active monitoring of the availability of the wireless channels and the application of pattern recognition techniques to the channel availability data. The prediction terms 112 include predicted network availability for the available wireless channels.

The processing device 102 receives the data message 110 and the prediction term 102. In one embodiment, the processing device 102 automatically assigns a time stamp to the data message. The time stamp may indicate when the data message was received or could indicate when the data message was created, in the event there may be a delay between the message is created and provided to the processing device 102.

The processing device 102 thereupon assigns a data message priority to the data message 110. This data message priority, which may be a number, codeword or other type of indicator, is based on factors relating to the data message. For example, the priority may be based on the component that generates the data message or may be based on the content of the data message itself or both. Using the above example of oil level, the priority may be determined based on the data message being generated by the oil level sensor and the measurement itself. The processing device 102 may use any suitable technique for determining the priority of the data message, such as a look-up table of predetermined priority levels, as discussed in further detail below.

When the data message priority is determined, the processing device associates a time factor with the data message. This time factor indicates a time to live (TTL) factor, which is the predetermined time in which the data message needs to reach the back end processing system. For example, a very high priority data message may have a very small TTL factor, indicating that this data message needs to be transmitted very quickly and may thereby justify being transmitted across a more expensive wireless channel. In contrast, low priority data messages may have a very long TTL factor and may not warrant being transmitting on expensive channels, but are more aptly suited for transmission on cheaper channels, when they become available.

The processing device 102 then determines which wireless channel would be the best option for data transmission based on the priority level and the prediction terms. This may be performed by a simple analysis of the priority level of the data message and the predicted available channels, as well as including the associated costs of the channels themselves. For example, a channel having a very wide transmission range may include a more expensive transmission cost than a channel having a smaller range. But if under the prediction terms, the remote device is predicted to be within only one transmission range before the TTL factor expires, the processing device 102 may then assign the data message to the message queue 106 associated with the predicted available channel. If more than one channel is predicted to be available, the processing device may select the cheaper channel, thereby allowing the remote device 100 to transmit the data message within the TTL factor and also save transmission costs.

Once the processing device 102 selects a particular wireless transmission channel, the data message 110 is converted into a data packet 114, where in one embodiment the data packet, 114 includes the data message, time stamp and expiry date based on the TTL factor. The processing device 102 provides the data packet to the selected message queue 106. The data packet 114 may also include additional information that may be usable by the back end processing device, such as header information identifying the remote device 100, for example.

Figure 2:
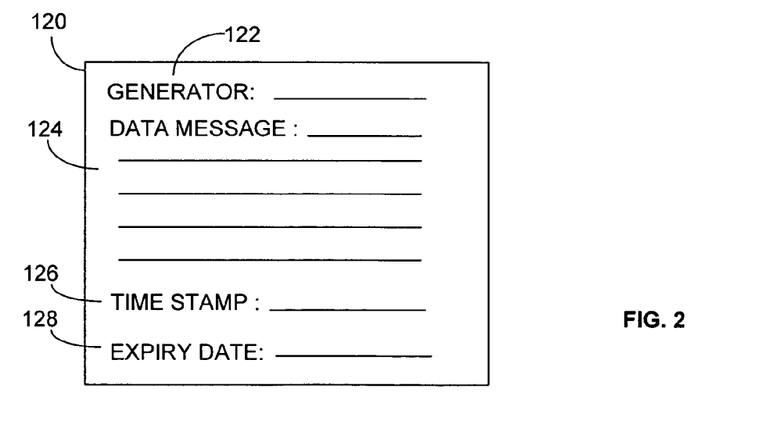
FIG. 2 illustrates a graphical representation of one embodiment of a data packet.

FIG. 2 illustrates a graphical representation of one embodiment of a data packet 114. The data packet 114, in this exemplary embodiment, includes a generator field 122, a data message field 124, a time stamp 126 and the corresponding expiry date 128. Using the above example of an oil level sensor, the generator field 122 may indicate the component that recognized the oil level, the data message field 124 would include information as to the irregular oil level, the time stamp field 126 may indicate the time that the oil level was recognized or the time the processing device 102 received the data message 110. As discussed above, the expiry date field 128 may be computed based on the TTL factor in relation to the time stamp, for example of the TTL factor is 24 hours, the expiry date may be exactly 24 hours from the time stamp.

Referring back to FIG. 1, the data packet 114 is thereby provided to an assigned message queue 106. As an example, assume the data message 110 is given a high priority setting and the transmission prediction terms 112 predict the remote device 100 will be in a transmission range of a cellular network having a high transmission cost, the data packet 114 may be buffered in the message queue 106 associated with the cellular transmitter 108. Thus, when the remote device 100 enters the transmission range of the cellular channel and the channel is available, the transmitter 108 can transmit the contents of the message queue 106. Thereby, in this remote device 100, data messages 110 are prioritized and assigned to one of multiple message queues 106 based on predictability of channel availability and the priority of the data message. In addition, in this example, it is also predicted the less expensive channels, for example a Bluetooth or wireless LAN channel, would not be available before the expiry date.

Figure 3:
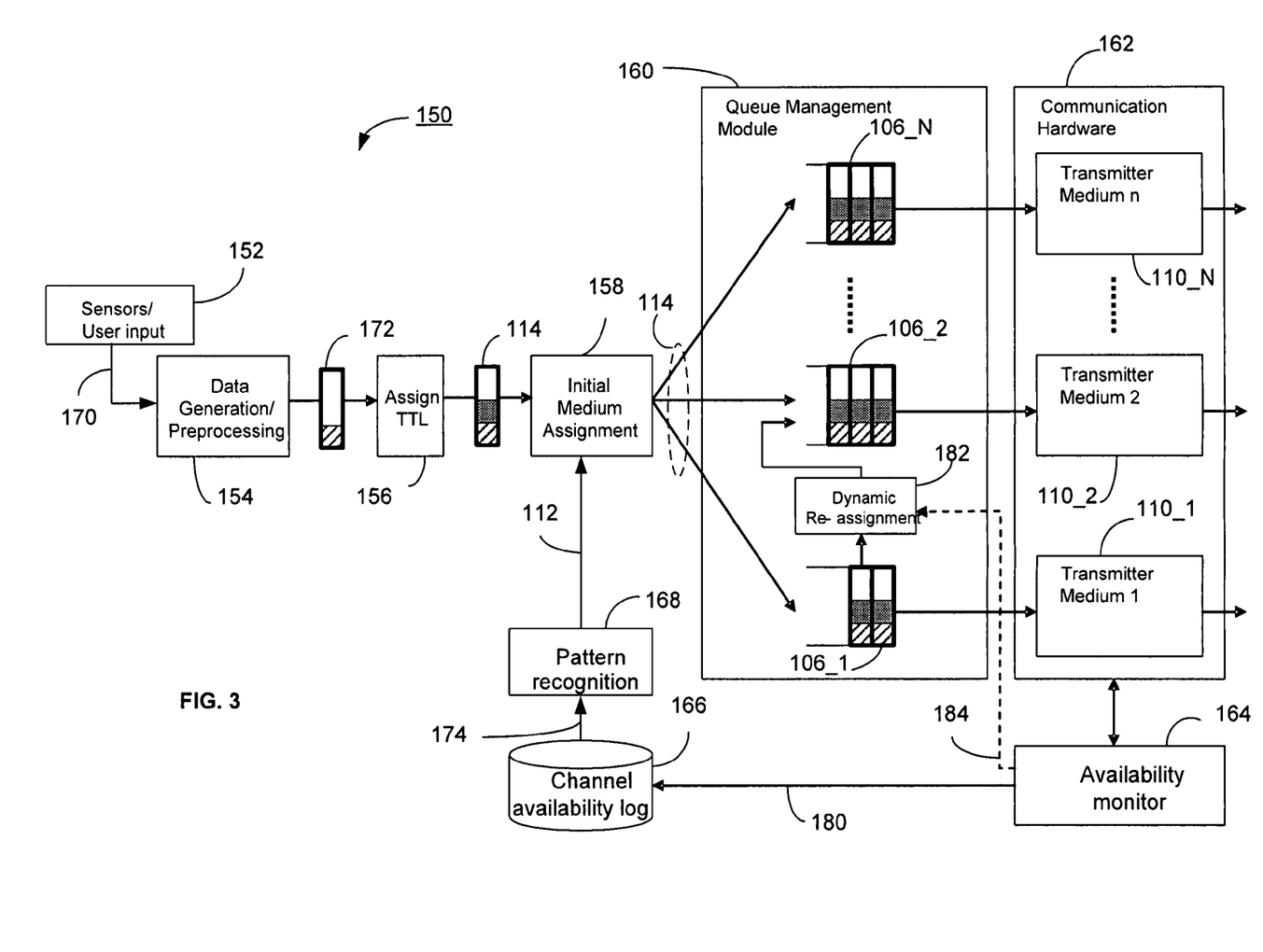
FIG. 3 illustrates a block diagram of another embodiment of a remote device for transmitting data across one of a plurality of wireless channels.

FIG. 3 illustrates another embodiment of a remote device 150 including sensor/input device 152, data generation/preprocessing device 154, a TTL assigning device 156, an initial channel assigning device 158, a management queue 160 including the queues 106 and communication hardware 162 including the transmitter/receivers 108. The remote device 150 further includes an availability monitor 164, a channel availability log 166 and a pattern recognition device 168.

In this embodiment, the sensor/user input device 152 may be any suitable device or devices within the remote device 150 that are operative to generate feedback data. The data generation/preprocessing device 154, TTL assigning device 156 and initial channel assigning device 158 may be one or more processing devices operative to perform the below-noted functions through hardware, software or a combination thereof. The availability monitor 164 may be implemented in hardware and/or software and is operative to monitor and note when the various channels become available. This monitoring may be done through feedback from the transmitters 108 indicating when the remote device 150 is within and subsequently leaves the transmission range of the corresponding channel, possibly including noting a channel availability starting point and time duration of availability. The channel availability log 166 may be one or more memory devices storing this channel availability data generated by the availability monitor 164. The pattern recognition device 168 may also be implement in hardware, software or a combination thereof for performing one or more different types of pattern recognition activities on the channel availability data stored in the log 166.

In the embodiment of FIG. 3, the data generation/preprocessing device 154 receives input data 170 from the sensor/user input device 152. In one example, this input data 170 may include information about one or more components or general operation of the remote device, such as from an embedded sensor. The data generation/preprocessing device 154 processes the input data 170 to generate a preliminary data packet 172 including the data message and a time stamp indicating when the input data 170 was either generated or received.

In this embodiment, the TTL assigning device 156 receives the data packet 172 and thereupon assigns the corresponding TTL factor. As discussed above with respect to FIG. 1, this may be accomplished by determining the priority level of the data message, such as using a look-up table (not expressly shown) having predefined priority levels for the available types of input data 170. From the priority level, the TTL factor is determined as this may be a defined correlation, for example high priority level items have a TTL factor of 3 hours and critical priority level items have a TTL factor of 20 minutes. The assigning device 156 thereupon generates the data packet 114, which includes the data message, the time stamp and the expiry date, where the expiry date is the combination of the time stamp and TTL factor.

The initial medium assignment device 158 receives the data packet 114 and thereupon assigns the packet 114 to one of the queues 106 for subsequent transmission over the selected wireless channel associated therewith. The medium assignment device 158 also receives transmission prediction terms 112 from the pattern recognition device 168.

As noted above, the availability monitor 164 monitors and notes when the different wireless channels become available. The availability monitor 164 generates channel availability data 180 and provides this data to the channel availability log 166. The channel availability data 180 indicates various factors associated with the wireless channels, such as indicating the times when the channels become available and when their availability is lost. The data 180 may also include, in more advanced systems, positioning information indicating the current positions of the remote device when the channels were available, where this embodiment would incorporate an additional global positioning system to record the position information and combine such information with the data generated by the availability monitor 164.

The pattern recognition device 168 receives channel data 174 from the log 166 and performs pattern recognition operations to recognize various patterns in the data. For example, the pattern recognition device 168 may utilize one of many available pattern recognition operations, such as a Fast Fourier Transform, to recognize channel availability data. This recognized data predicts when the different channels will become available and thereby predicts when transmission across the different channels will be possible.

In one embodiment, the transmission prediction terms 112 may be time indicators indicating the different time intervals when different channels are available. The channel assigning device 158 may perform a simple comparison operation to determine which channel or channels will be available before the expiry date. In another analysis, the assigning device 158 may then further reduce this list of available channels based on transmission costs. For example, with a TTL factor of 2 days, it may be predicted that the remote device will be in communication range of a terrestrial communication channel, a cellular channel, a wireless local area network channel. If the wireless LAN channel has the cheapest transmission cost, the data packet 114 may be assigned to the message queue 106 associated with the wireless LAN network channel because while it is predicted that all three channels will be available, the data message can be transmitted at a reduced cost within the noted time period and thereby at a reduced transmission cost.

In another embodiment, the remote device 150 further includes a dynamic re-assignment device 182. This device 182 is coupled to the availability monitor 164 to receive channel activity signals 184 indicating when various channels become active. The device 182 has the ability to access and transfer data between different message queues 106 in the queue management module 160.

As noted above, the data packets 114 written to the various message queues 106 are each assigned a TTL factor and include an expiry date. This information is important because typically the remote device should transmit the data message before the expiration of this time. While the initial channel is selected based on an estimated prediction, this channel may not necessarily become available before the expiration time. Therefore, the dynamic re-assignment device 182 is operative to insure that the data message is subsequently transmitted using alternative means, if available.

In one embodiment, as the expiration time approaches, the dynamic re-assignment device 182 coordinates with the availability monitor 160 to determine which, if any other channels are available. Various embodiments may be implemented to coordinate time before expiration with acceptable channels. For example, the dynamic re-assignment device 182 may always transmit all data messages from queues for more expensive channels if a cheaper channel is available. In another example, a determination can be made that if a data message is within a pre-determined time period of expiration, for example half an hour, the dynamic re-assignment device 182 may re-assign the data message to a more expensive channel that is predicted to be available or is already available. In another embodiment, the dynamic re-assignment device 182 may re-assign the data message based on an updated analysis of prediction information, if available. As recognized by one skilled in the art, there are numerous other available techniques available to the dynamic re-assigning device 180, whereupon the data message in the message queue 106 is actively monitored to insure transmission across at least one of the available channels before the expiration time based on the TTL factor.

Figure 4:
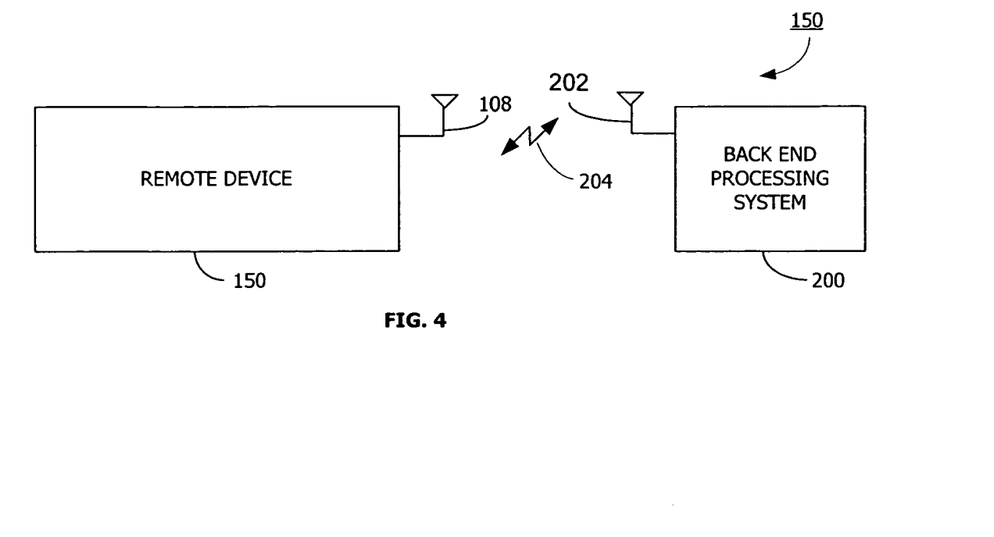
FIG. 4 illustrates a block diagram of a remote device and a back end processing system.

FIG. 4 illustrates a block diagram of another embodiment of the remote device 150 providing for data transmission across one of a plurality of wireless channels. It is noted that the below-described embodiment as to the remote device 150 is also applicable to the remote device 100 illustrated in FIG. 1. The illustrated remote device 150 includes one of the plurality of transmitters 108 to allow for wireless transmission.

In this embodiment, the remote device 150 is in wireless communication with a back end processing system 200. This system 200 may be one or more computing devices operating in either stand-alone or networked functionality to perform any of a variety of processing operations associated with the remote device. For example, if the remote device 150 is a PDA, the back end processing system 200 may be a central processing network operated by the PDA manufacturer or service provider, where the back end processing system 200 may provide computing resources associated with the PDA.

In this embodiment, the back end processing system 200 also includes a receiver 202 for receiving the channel availability data 180 as collected from the channel availability monitor (not shown) in the remote device 150. In one embodiment, the remote device 150 may provide the newly acquired data stored in a channel availability log (not expressly illustrated). With this channel availability data, the back end processing system may be able to perform pattern recognition operations. The back-end processing system may be able to perform higher level or more complex pattern recognition routines based on larger resource availability than the remote device 150, such as data mining techniques as recognized by one having ordinary skill in the art. For example, the back end processing system 200 does not have the power constraints of the remote device 150, therefore the processors on the back end system do not need to worry about power usage. Additionally, the back end processing system 200 may be able to utilize multiple processors for parallel data computation or may have large storage capacity and can maintain a large database of channel availability data to perform pattern recognition on a larger data field.

In this embodiment, once the back end processing system 200 computes the prediction terms, these terms may be wirelessly transmitted back to the mobile device 150. Thereupon, the mobile device 150 may use these prediction terms in a manner consistent with the above described embodiments.

Figure 5:
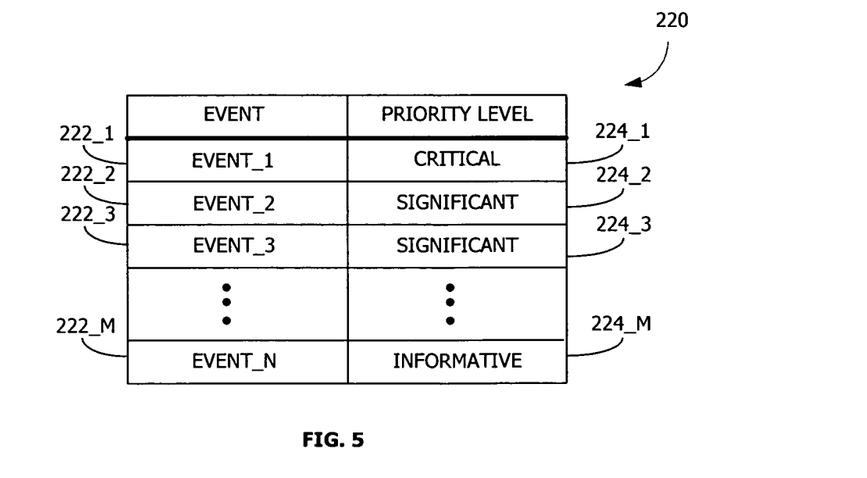
FIG. 5 illustrates a graphical representation of a data message priority database.

As noted above, the data messages have associated priority and this priority corresponds to a TTL factor. FIG. 5 illustrates a graphical representation of one embodiment of a priority database 220 that may be included with the remote device 100 or 150. The database 220 includes message fields 222_1, 222_2, 222_3, 222_M, where M may be any integer value (collectively referred to as 222). Each of the message fields is assigned a priority level 224_1, 224_2, 224_3, 224_M (collectively referred to as 224). In the operation of the processing device 102 of FIG. 1 and the data generation/preprocessing device 152 of FIG. 3, the data message is received and the processing device 102/152 can look up the priority level 224 based on the event 222. In this embodiment, the table 220 is a look-up table, where the remote device includes having the various anticipated data messages 222 assigned priority levels 224.

Figure 6:
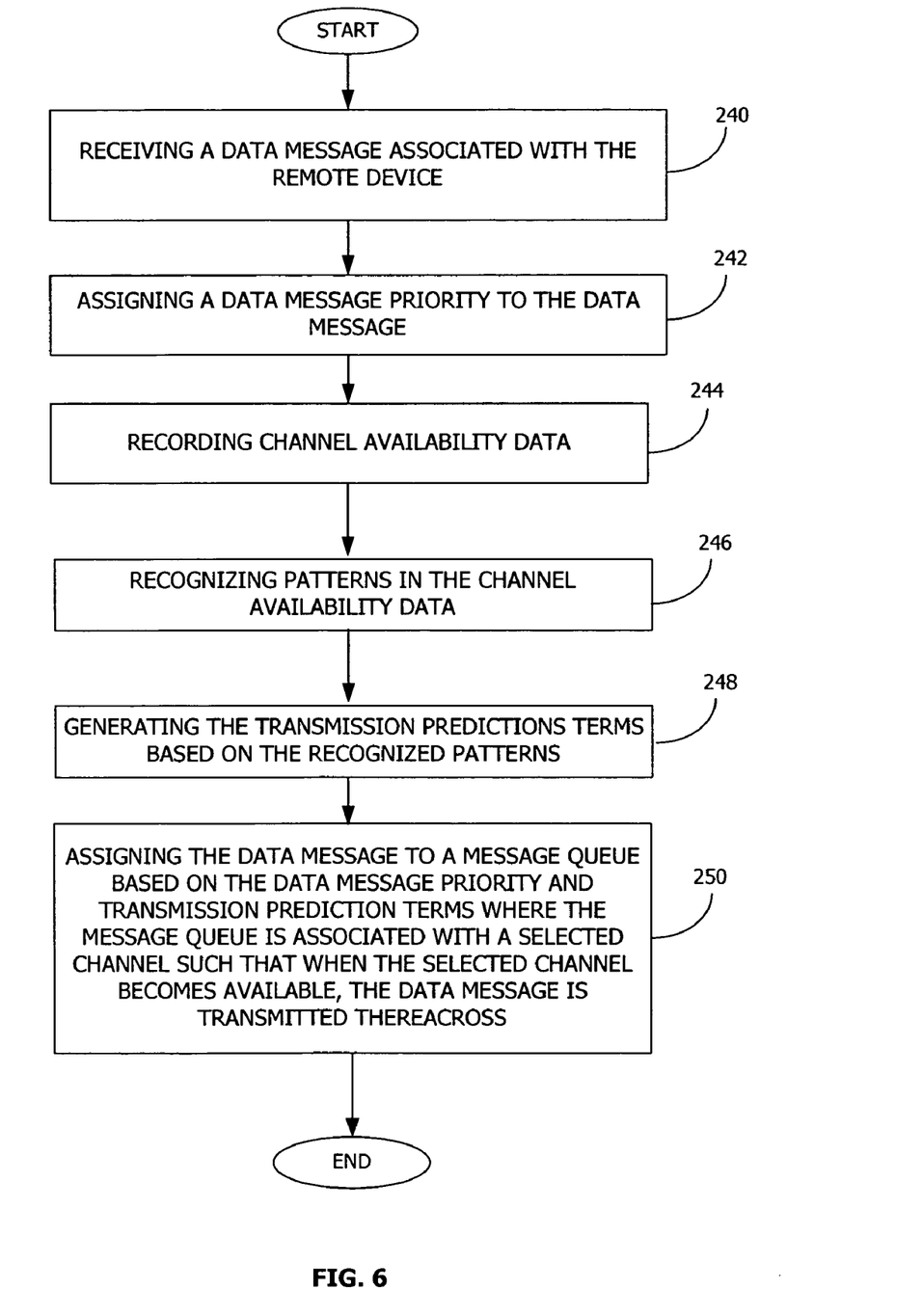
FIG. 6 illustrates a flowchart of the steps of one embodiment of a method for transmitting data from a remote device across one of a plurality of wireless channels.

FIG. 6 illustrates a flowchart of the steps of one embodiment of a method for transmitting data across one of a several wireless channels. For further clarification, the steps of this method will be explained relative to an exemplary example, which is not meant to be so limiting as noted herein. In one embodiment of the method, the first step, step 240, is receiving a data message associated with the remote device. In an example where the remote device is a motor vehicle, the processing device may receive a warning notification that the check engine light has come on. In addition to normal vehicular operations of illuminating the check engine light, the processing device may also assign a data message priority to the data message, step 242. The step of prioritization may include accessing a look-up table that indicates a data message directed to the check engine light has a data message priority of critical. In addition to prioritizing the data message, the processing device may record a time stamp indicating when the message was received and also retrieve a TTL factor based on the priority. For example, there may be a direct correlation of the TTL factor to the priority level, such as an urgent priority has a TTL factor of 30 minutes.

Concurrently, in this method the remote device is also operative to perform the step of recording channel availability data, step 244. Based on this channel availability data, the next step, step 246, is recognizing patterns in the channel availability data. As noted above, these pattern recognition operations may be performed locally on the remote device or remotely on a back end processing system. The next step, step 248, is generating the transmission prediction terms based on the recognized patterns. If the recognition is done remotely, the prediction terms are provided to the remote device.

Thereupon, in the example of the remote device being a motor vehicle and the data message being a check engine warning, the next step, step 250, is assigning the data message to a message queue based on the data message priority and the transmission prediction terms, where the selected message queue is associated with a channel that has been selected as being predicted to be available before the data messages expiration date. Thus, when the wireless channel becomes available, the data message may be transmitted thereacross. Thereupon, this embodiment of the method is complete. It is also noted that other embodiments of the method may be performed, including the varying embodiments discussed above with respect to FIG. 3, including actively monitoring the message queue and dynamically re-assigning the message queue, if needed, before the data message expires.

Figure 7:
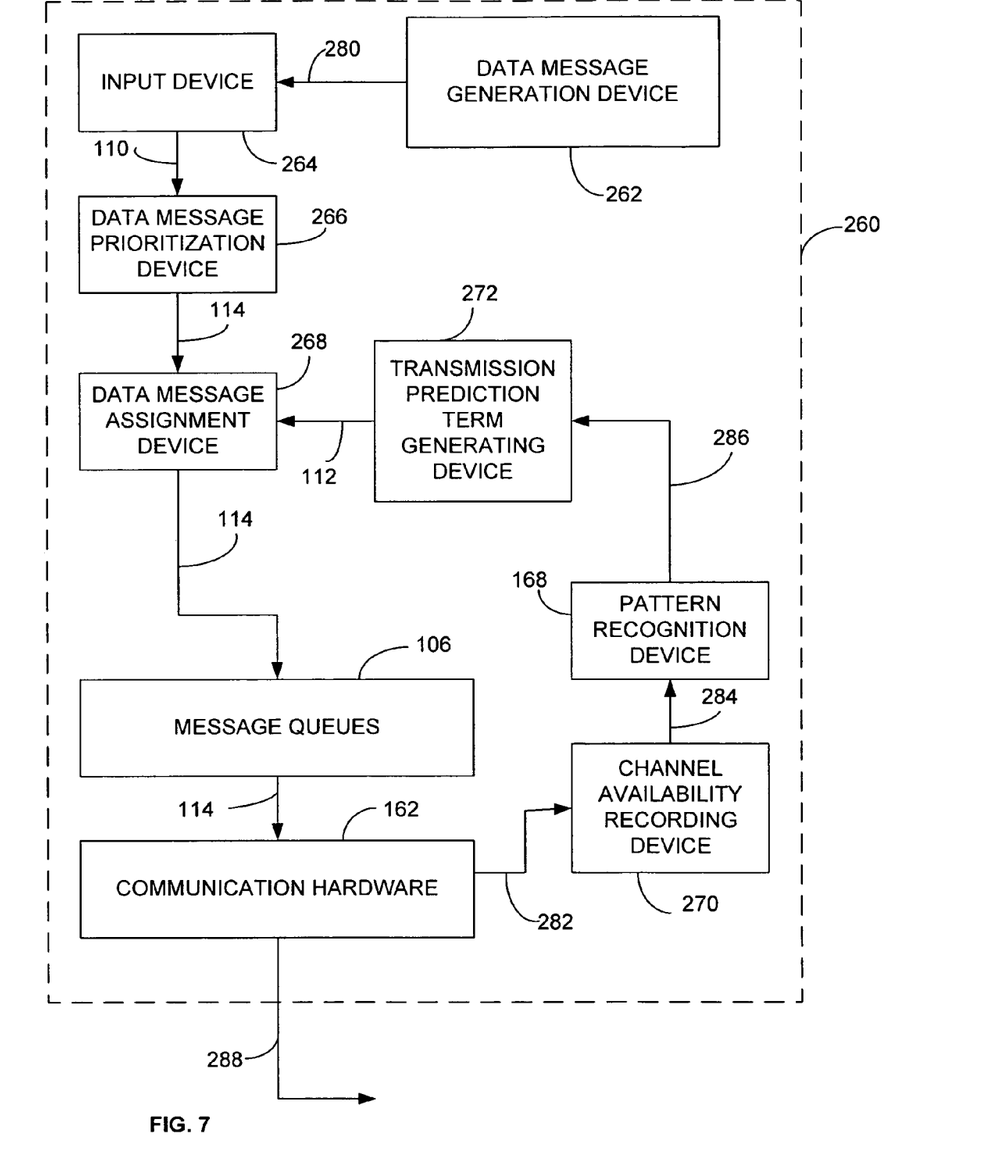
FIG. 7 illustrates a block diagram of an apparatus for the transmission of data from a remote device across one of a plurality of wireless channels.

FIG. 7 illustrates one embodiment of an apparatus 260 for transmitting data across one of a plurality of wireless channels. The apparatus 260 includes a data message generation device 262, an input device 264, a data message prioritization device 266, a data message assignment device 266, message queues 106, communication hardware 162, a channel availability recording device 270, the pattern recognition device 168 and a transmission prediction term generating device 272. The devices 262, 264, 266, 268, 270, 168 and 272 may be implemented in hardware, software, or a combination thereof for performing, among other things, the below indicated operations.

The input device 264 receives incoming data 280 from the data message generation device 262. The incoming data 280 may include a data message, where the data message is associated with the apparatus 260. The data message generation device 262 may be a sensing device, user input device or other type of generating device as recognized by one having ordinary skill in the art. The input device 264 may parse out the data message 110 and provide this message 110 to the data message prioritization device 266. The prioritization device 266 is operative to prioritize the data message based on predefined priority terms, such as may be defined by a look-up table or other reference source within the apparatus 260. This prioritization also includes generating an expiry date based on a TTL factor associated with a time stamp of the data message and the TTL factor.

The device 266 generates the data packet 114, which in one embodiment, include the data message, the time stamp and the expiry date. The data message assignment device 268 receives the data packet 114.

In the apparatus 260, the channel availability recording device 270 actively monitors the communication hardware, including receiving channel availability data 282. From these signals, the channel availability recording device determines when different channels are available and generates channel availability data 284. The pattern recognition device 168 receives this data 284 and performs one or more operations to recognize patterns in the data. In one embodiment, the pattern recognition device 168 is locally disposed in the apparatus 260, such as illustrated in FIG. 7, although it is recognized that the pattern recognition device 168 may also be disposed on a back end processing system, such as described above with respect to FIG. 5.

The pattern recognition device 168 generates recognized patterns 286, which are provided to the transmission prediction term generating device 272. This device 272 thereupon generates prediction terms 112 based on the patterns 286. These prediction terms indicate predicted times when various wireless channels will become available. These prediction terms 112 are provided to the data message assignment device 268 so that the device 268 is operative to assign the data message 110 in the data packet 114 to one of the message queues 106 based on the data message priority and the transmission prediction terms. Therefore, when the channel becomes available, the data packet 114 can be provided from the queue 106 to a transmitter (not specifically illustrated) within the hardware 162 for wirelessly transmitting a transmission signal 288.

Therefore, through the active monitoring of various wireless channel availability, the remote device may select the best possible choice for wireless transmission. This transmission selection is based on the data message itself, an expiration factor associated with a priority level of the message and recognized channel availability for the remote device itself. Through this prediction approach, transmission techniques can be optimized to select the most cost-effective and also timely transmission means available to the remote device, while also maintain the required level of exigency for data messages.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A remote device for transmitting data through one of a plurality of wireless channels, the remote device comprising:
a plurality of message queues, each message queue associated with one of the plurality of channels;
a processing device operative to:
receive a data message associated with the remote device;
assign a time stamp to the received data message;
determine a data message priority of the received data message;
associate a time factor with the prioritized data message based on the data message priority;
assign an expiry date to the prioritized data message where the expiry date is a combination of the time stamp and the time factor; and
assign the data message to one of the message queues based on the expiry date and transmission prediction terms, which identify predicted likelihood of network availability for the different available wireless channels, where the assigned message queue is associated with a selected channel such that when the selected channel becomes available, the data message is transmitted therethrough; and
a dynamic re-assignment device operative to access and transfer data between different message queues in order to ensure transmission of the prioritized data message before the expiry date in case that the channel initially selected does not become available before the expiry date.

2. The remote device of claim 1, the processing device further operative to:
monitor and record channel availability data;
recognize patterns in the channel availability data; and
generate the transmission prediction terms based on the recognized patterns.

3. The remote device of claim 1 wherein when the processing device prioritizes the data message, the data message includes a time factor indicating time in which the data message is to be transmitted, the processing device further operative to:
monitor the assigned message queue to determine if the data message has been sent before the expiration of the time factor; and
if the message has not been sent, determine an open channel of the available wireless channels and re-assign the data message to the open channel such that the data message can be transmitted across the open channel.

4. The remote device of claim 1, the processing device further operative to:
monitor the availability of the channels that are less expensive than the selected channel;
if a less expensive channel becomes available, re-assign the data message to the available less expensive channel; and
transmit the data message on the less expensive channel.

5. The remote device of claim 1 further comprising:
a look-up table having a plurality of data message priority terms stored therein such that the priority of data message is based on accessing the look-up table using the data message.

6. A method for data transmission through one of a plurality of wireless channels from a remote device, the method comprising:

receiving by a processing device of the remote device a data message associated with the remote device;

assigning by the processing device a time stamp to the received data message;

determining by the processing device a data message priority of the received data message;

associating by the processing device a time factor with the prioritized data message based on the data message priority;

assigning by the processing device an expiry date to the prioritized data message where the expiry date is a combination of the time stamp and the time factor;

assigning by the processing device the data message to a message queue based on the expiry date and transmission prediction terms, which identify predicted likelihood of network availability for the different available wireless channels, where the assigned message queue is associated with a selected channel such that when the selected channel becomes available, the data message is transmitted; and transferring by the processing device the prioritized data message from the assigned message queue to another in order to ensure transmission before the expiry date in the case that the selected channel does not become available before the expiry date.

7. The method of claim 6 further comprising:
recording channel availability;
recognizing patterns in the channel availability data; and
generating the transmission prediction terms based on the recognized patterns.

8. The method of claim 7 wherein the pattern recognition is performed locally on a remote device.

9. The method of claim 7 wherein the pattern recognition is performed remotely on a central processing device.

10. The method of claim 6 wherein the prioritized data message includes a time factor indicating time in which the data message is to be transmitted, the method further comprising:

monitoring the assigned message queue to determine if the data message has been sent before the expiration of the time factor;

if the data message has not been sent, determining an open channel of the available wireless channels; re-assigning the data message to the open channel; and transmitting the data message across the open channel.

11. The method of claim 10 further comprising:
monitoring the availability of the channels that are less expensive than the selected channel;
if a less expensive channel becomes available, re-assigning the data message to the available less expensive channel; and
transmitting the data message on the available less expensive channel.

12. The method of claim 6 wherein the priority of data message is based on accessing a look-up table using the data message.

13. An apparatus for transmitting data through one of a plurality of wireless channels, the apparatus comprising:
an input device receiving a data message associated with a remote device;
a plurality of message queues, each message queue associated with one of the plurality of channels;

a data message prioritization device operative to:
assign a time stamp to the received data message;
determine a data message priority of the received data message;
associate a time factor with the prioritized data message based on the data message priority; and
assign an expiry date to the prioritized data message where the expiry date is a combination of the time stamp and the time factor;

a transmission prediction term generating device operative to generate transmission prediction terms based on recognized patterns of channel availability;

a data message assignment device operative to assign the data message to one of the message queues based on the data expiry date and the transmission prediction terms, which identify predicted likelihood of network availability for the different available wireless channels, such that when the selected channel becomes available, the data message is transmitted therethrough; and a dynamic re-assignment device operative to access and transfer data between different message queues in order to ensure transmission of the prioritized data message before the expiry date in case that the channel initially selected does not become available before the expiry date.

14. The apparatus of claim 13 further comprising:
a channel availability recording device monitoring and recording channel availability data; and
a pattern recognition device recognizing patterns in the channel availability data.

15. The apparatus of claim 14 wherein the pattern recognition device is disposed within the remote device such that the pattern recognition is locally performed.

16. The apparatus of claim 14 wherein the pattern recognition device is disposed external to the remote device such that the pattern recognition is remotely performed.

17. The apparatus of claim 13 wherein the data message prioritization device prioritizes the data message, the data message includes a time factor indicating time in which the data message is to be transmitted, the apparatus further comprising:

a monitoring device operative to monitor the message queue to determine if the data message has been sent before the expiration of the time factor; and if the data message has not been sent, the monitoring device further operative to determine an open channel of the available wireless channels; re-assign the data message to the open channel such that the data message can be transmitted across the open channel.

18. The apparatus of claim 13, the processing device further operative to:
monitor the availability of less expensive channels;
if a less expensive channel becomes available, re-assign the data message to the available less expensive channel; and
transmit the data message on the available less expensive channel.

19. The apparatus of claim 13 further comprising:
a look-up table having a plurality of data message priority terms stored therein such that the priority of data message is based on accessing the look-up table using the data message.

* * * * *

UNITED STATES PATENT AND TRADEMARK OFFICE
CERTIFICATE OF CORRECTION

PATENT NO. : 7,616,960 B2 Page 1 of 1
APPLICATION NO. : 11/395960
DATED : November 10, 2009
INVENTOR(S) : Anke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this

Nineteenth Day of October, 2010

David J. Kappos
*Director of the United States Patent and Trademark Office*